Figure 1:
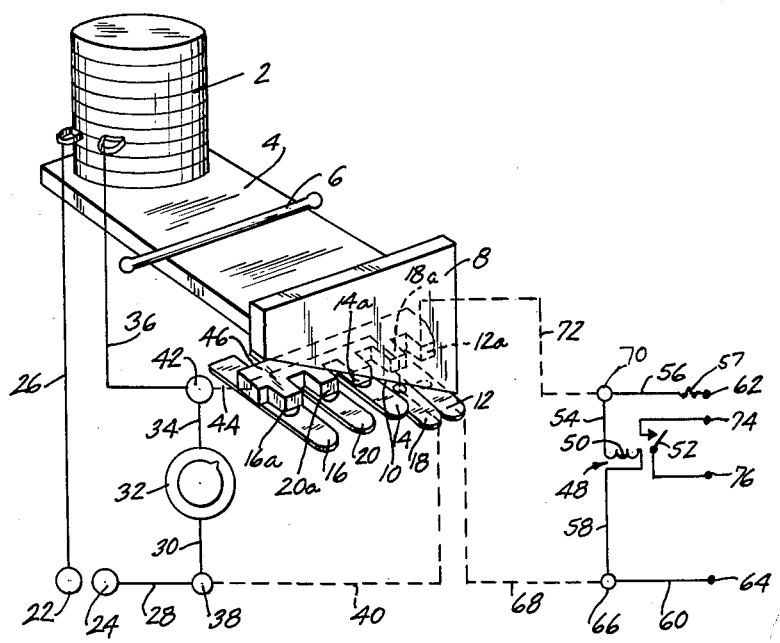

Jan. 29, 1963     A. M. COHEN     3,076,099

METER RELAY SYSTEM

Filed Nov. 25, 1960                              2 Sheets-Sheet 1

INVENTOR.
ARTHUR M. COHEN

BY
*James and Franklin*
ATTORNEYS

United States Patent Office 3,076,099
Patented Jan. 29, 1963

3,076,099
METER RELAY SYSTEM
Arthur M. Cohen, Sturgis Highway, Westport, Conn.
Filed Nov. 25, 1960, Ser. No. 71,766
15 Claims. (Cl. 307—41)

The present invention relates to a system by means of which a wide variety of control or indicator operations can be accomplished rapidly and accurately in accordance with the sensing of electrical signals. The system is particularly well adapted for use with extremely low-level input signals.

The system of the present invention is useable in a vast number of applications, unlimited to all intents and purposes both by the nature of the controlling parameter and by the type of control or indicator operation ultimately to be performed. All that is required is that the controlling parameter be capable of translation into an electrical signal the magnitude of which varies as does the magnitude of that parameter, even if that electrical signal has a power content of only a few microwatts. Control can be accomplished in different ways, either through the direct actuation or energization of controlled elements in the nature of electrical circuit components such as resistors or the indirect energization of external devices through the actuation of directly controlled elements such as relays or solenoids. The system can be used for control of an electrical circuit, for classification or sorting of objects on a production line, or for many other purposes. The system is so designed that even though the controlling input signal may, as has been mentioned, have a power content of only a few microwatts, the directly controlled electrical output may be considerably greater than that, on the order of several watts, and if the directly controlled elements are in the nature of relays, the ultimately controlled devices may involve an even greater power consumption.

The system of the present invention is outstanding insofar as accuracy, speed of response and stability are concerned. A plurality of sequential control steps may be selectively actuated in accordance with the signals the magnitudes of which differ from one another by amounts on the order of 2.5–20 millivolts, and with signal currents within the 7.5–60 microamperes range, with response times not exceeding 200 milliseconds. The arrangement is such that the particular signal values at which the individual controlled elements are energized may readily be adjusted to correspond to the design requirements of the particular environment in connection with which the meter relay system is being employed, and the signal operating points for actuation and de-actuation of the individual controlled elements can be made to differ depending upon whether the control signal is increasing or decreasing when that is a desired operating characteristic.

Input signals may be derived from strain gauges, thermocouples, thermistors, photoelectric cells, and other comparable sensitive devices, as well as directly from electrical lines which are to be regulated. The output from the system may be utilized to indicate the existence of certain predetermined conditions either visibly or audibly, or to control external systems either in closed or open loop control arrangements.

The basic elements of the system are entirely non-electronic and the entire system may also be non-electronic, thereby making for an adjustment-free operating life measured in terms of years of continuous service.

Broadly considered, the system utilizes a mechanical meter relay unit having two sets of electrical contacts, the contacts of each set being arranged in sequential relative alternation with the contacts of the other set, the contacts being sequentially opened and closed in accordance with the position of an armature attracted by a signal coil. One set of contacts controls those elements which are to be directly controlled and which are located in the output, or controlled, circuit of the system. The contacts of the other set control impedances connected in the circuit with the signal coil, thereby to modify the current flowing through that coil, and hence the movement of the armature, in accordance with the position of the armature. Hence, as the armature is moved in a given direction in accordance with, for example, an increase in the signal applied to the signal coil, it will sequentially: (a) energize a first controlled element (via a contact of the first set), (b) change the impedance of the circuit to the signal coil and thus change the energization thereof for a given signal (via a contact of the second set), (c) energize another controlled element (via another contact of the first set), (d) further alter the impedance of the circuit to the signal coil (via another contact of the second set), and so on until a position of equilibrium is reached in which the modification of the signal coil circuit impedance will balance out the effect of the signal. All of this will occur rapidly and accurately. The values of the input signal which will cause the individual controlled elements to be energized will depend upon the degree to which the signal coil circuit impedance is modified as the armature moves to open and close the contacts of the second mentioned set of contacts. Hence the energizing points for the controlled elements can be readily modified merely by utilizing impedance elements actuated by the contacts of the second set which have appropriate impedance values. A differential between the points at which the individual controlled elements are actuated and de-actuated may readily be accomplished by having the contacts of the first set additionally modify the impedance in the signal coil circuit in an appropriate manner.

When signals of low power content are employed, those signals may be amplified before being fed to the signal coil. The use of a magnetic amplifier is particularly effective in this regard, both because of its non-electronic character and its ready modification, in the manner here specifically disclosed, to render its operation, and hence the energization of the signal coil, independent of variations in the voltage of the source of power employed, that source of power in turn being independent of the signal source. When a magnetic amplifier is employed the output winding thereof and the signal coil of the meter relay unit are connected to one another and to the external power source. The signal source is connected to a control winding of the magnetic amplifier. The power source is connected to a second control winding of the magnetic amplifier which is so designed as to modify the output of the magnetic amplifier inversely with the voltage of the power source, thus rendering the output of the magnetic amplifier independent of variations in that voltage. The impedance elements controlled by the first set of contacts are also operatively connected to this second control winding of the magnetic amplifier in order to modify the output thereof. The overall effect of these impedance elements on the output from the magnetic amplifier, and hence on the energization of the signal coil, is to tend to bring that output, and hence the signal coil energization, to a predetermined nominal value for all values of the signal, the armature of the meter relay unit being stationary whenever the signal coil has that nominal value of energization. In this way the position of the armature, and hence the condition of the contacts, is made accurately sensitive to the instantaneous value of the signal.

Figure 2:
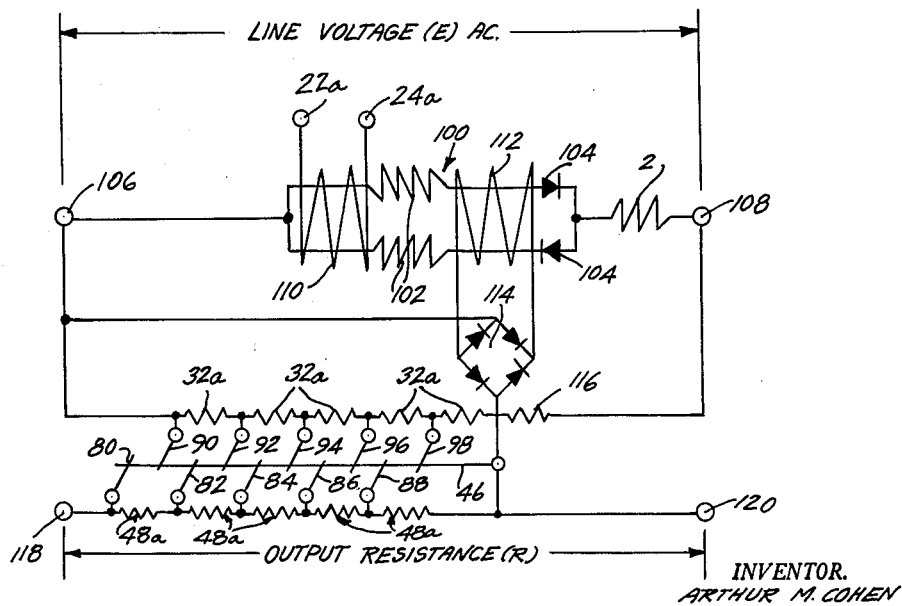
Figure 3:
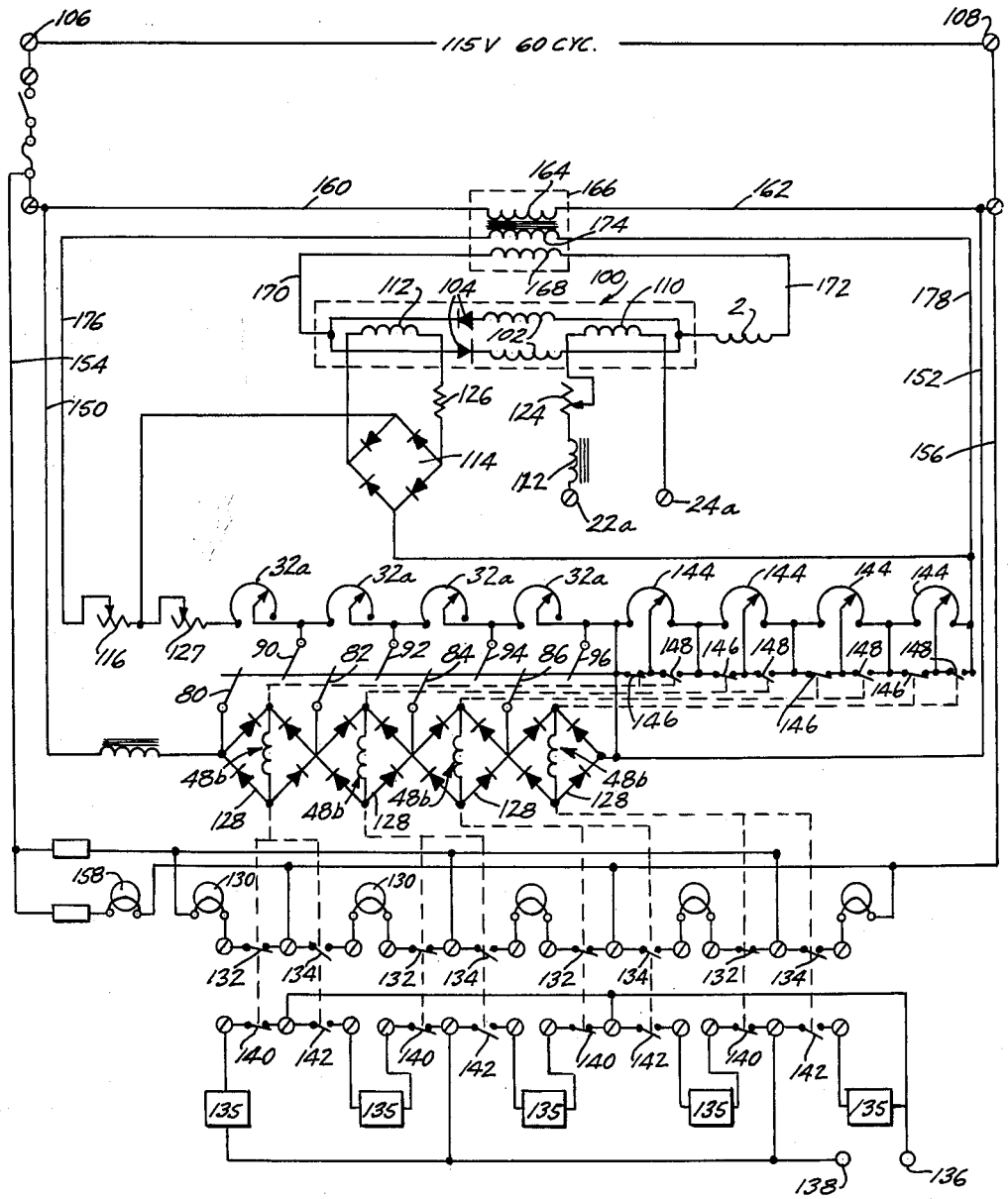

To the accomplishment of the above, and to such other objects as may hereinafter appear, the present invention relates to the design of a meter relay system as defined in the appended claims and as described in this specification, taken together with the accompanying drawings, in which:

FIG. 1 is a schematic representation of an idealized version of the meter relay unit and of certain of the electrical connections made thereto;

FIG. 2 is a circuit diagram of one version of a complete system of the present invention, a magnetic amplifier being employed to control the energization of the signal coil, and the controlled elements being in the form of resistors in an external circuit; and FIG. 3 is a circuit diagram of a more detailed version of a complete system of the present invention, also utilizing a magnetic amplifier for control of the energization of the signal coil, in which the controlled elements are in the form of relays which in turn control indicating devices and/or other devices, and in which those relays are respectively actuated and de-actuated at different signal values.

The meter relay unit which actually controls the operation of the system may take the form of a finger-type circuit controlling device such as disclosed in more detail in Cohen Patent 2,580,732 of January 1, 1952 entitled "Electromagnetic Unit." Such a device is schematically indicated in FIG. 1. It comprises a signal coil 2 which electromagnetically attracts an armature 4 pivoted at 6 and carrying at its free end a lift bar 8 having an inclined lifting surface 10 adapted to cooperate with a plurality of movable contacts 12, 14, 16, 18 and 20, those contacts normally being urged into engagement with fixed contacts 12a, 14a, 16a, 18a and 20a respectively and being movable out of engagement therewith in the sequence 12, 18, 14, 20, 16 as the lift bar 8 moves downwardly so as to bring its surface 10 into engagement with the respective contacts. The contacts 12, 14 and 16 comprise a first set of contacts, and the contacts 18 and 20 comprise a second set of contacts arranged in sequential relative alternation with the contacts of the first set. As shown in FIG. 1 the lift bar 8 is so located as to have moved contacts 12 and 18 away from the contacts 12a and 18a respectively, the contacts 14, 16 and 20 remaining in engagement with their respective fixed contacts. In the idealized form disclosed in FIG. 1, the signal coil 2 is adapted to be energized from voltage applied at terminals 22 and 24. Terminal 22 is connected to one end of the signal coil 2 by means of lead 26. Terminal 24 is connected to the other end of the signal coil 2 via leads 28 and 30, adjustable resistance 32 and leads 34 and 36. The junction point 38 between leads 28 and 30 is connected to contact 18 by means of lead 40. The junction point 42 between leads 34 and 36 is connected to contact 18a, via lead 44 and shorting bar 46.

In FIG. 1 the controlled device, generally designated 48, is in the form of a relay having a winding 50 which acts upon a switch 52, that winding being connected by leads 54, 56 (including current-limiting resistor 57) and 58, 60 to an external source of power applied to terminals 62 and 64. The junction 66 between the leads 58 and 60 is connected by lead 68 to contact 12, and the junction 70 between leads 54 and 56 is connected by lead 72 and shorting bar 46 to the contact 12a. The switch 52 controls an external circuit connected to terminals 74 and 76. When the energization of the signal coil 2 is at a minimal value, the armature 4 will not be operatively attracted thereto and the lift bar 8 will be raised until all of the contacts 12–20 engage with their respective fixed contacts 12a–20a. Under these circumstances both the resistance 32 and the relay winding 50 will be shorted out. As the energization of the signal coil 2 increases, as will be the case when the signal applied to the terminals 22, 24 increases, the armature 4 will be increasingly attracted thereto, and the lift bar 8 will move downwardly. It will first separate contact 12 from contact 12a, thus effectively energizing the relay winding 50, causing the switch 52 to close, and thus closing a circuit between the terminals 74 and 76. The closing of this circuit may be used for any desired purpose. The lift bar 8 will continue to move downwardly until the contact 18 is separated from the contact 18a. This will place the resistance 32 in series with the signal coil 2 and thus decrease the current energization thereof. If that decrease in signal coil energization counterbalances the signal applied thereto, bringing the energization of the signal coil 2 to a predetermined nominal value, the armature 4 will become stationary. The action of the controlled device 48 will thus be dependent upon the magnitude of the signal applied to the coil 2.

If the magnitude of the resistance 32 is not sufficient to completely counterbalance the signal and bring the energization of the signal coil 2 to its nominal value, the armature 4 will continue to be attracted by the coil 2, the lift bar 8 will continue to move down, the contact 14 will be separated from the contact 14a, and a second controlled device 48, similar to the one shown in FIG. 1 but connected to the terminals 14 and 14a, will be actuated, after which the contacts 20 and 20a will be separated. The contacts 20 and 20a cause the introduction into the circuit of the signal coil 2 of another resistance similar to the resistance 32 but connected to the contacts 20 and 20a. This additional resistance inserted in the signal coil circuit will tend to further counterbalance the signal and, if that counterbalancing is complete, will cause the armature 4 to become stationary. If that counterbalancing is not complete the armature 4 will continue to pivot, the lift bar 8 will continue to move downwardly, the contact 16 will be moved away from the contact 16a and a third controlled device 48 similar to the one illustrated in FIG. 1 but connected to the contacts 16 and 16a, will be actuated.

From this elementary description it will be apparent that the values of the resistors 32 introduced into the signal coil circuit by the opening of the contacts 18 and 20 respectively will determine the signal values at which the various controlled elements 48 are energized. In the simplified system of FIG. 1 only five movable contacts are disclosed, for controlling three controlled devices 48 at different signal levels, but obviously the number of contacts could be increased.

FIG. 2 discloses a more complete system particularly adapted for operation in connection with signal inputs of low power content, e.g. 1 or 2 microwatts. In this system the lift bar 8 is adapted to actuate the contacts 80, 82, 84, 86 and 88, defining a first set of contacts, and contacts 90, 92, 94, 96 and 98, defining a second set of contacts, all of the contacts normally engaging with the shorting bar 46 which constitutes a common fixed contact. The first set of contacts is arranged in sequential relative alternation with the second set of contacts. A magnetic amplifier generally designated 100 is utilized to amplify the input signal, applied across the terminals 22a, 24a, and to energize the signal coil 2. That magnetic amplifier 100 is provided with appropriately connected output windings 102 and rectifiers 104, connected in series with the signal coil 2 between terminals 106 and 108, to which some appropriate source of alternating line voltage is applied. The signal is applied via terminals 22a and 24a to the control winding 110 of the magnetic amplifier 100 so that, in accordance with the known principles, variations in the signal voltage will result in corresponding, but amplified, variations in energization of the signal coil 2.

The energization of the signal coil 2 will also be dependent upon the voltage applied to terminals 106 and 108. In order to render the operation of the system insensitive to variations in that line voltage, a second control winding 112 is applied to the magnetic amplifier 100, that winding being energized by the output of full wave rectifier 114 connected across the terminals 106 and 108 in series with resistor 116. The control winding 112 is so wound that as its current increases the load current through the output winding 102 of the magnetic amplifier 100 will decrease. The number of turns of the winding 112 and the value of the resistor 116 will be so chosen that the output-current-decreasing effect of the winding 112 caused by an increase in voltage across the terminals 106, 108 will cancel out the normal tendency of that voltage increase to cause an increase in the output current through the magnetic amplifier 100.

The first set of contacts 80-88 correspond to the contacts 12-16 in FIG. 1, and control the energization of the controlled devices 48a, which are here shown in the form of resistances adapted to be sequentially inserted into an external circuit connected to the terminals 118 and 120. The second set of contacts 90-98 correspond to the terminals 18 and 20 of FIG. 1, in that they control resistances 32a which in turn control the current in the signal coil 2. In the system of FIG. 2 these resistors 32a are connected in shunt with the control winding 112. As these resistors 32a are, one by one, inserted into the circuit through the sequential opening of the contacts 90-98, the current through the control winding 112 increases and hence, for a given signal value applied across the terminals 22a, 24a, the amount of current passing through the output windings 102 and energizing the signal coil 2 will decrease.

When the signal applied to the terminals 22a, 24a is below a predetermined value, the energization of the signal coil 2 will be minimal, the armature 4 will not be effectively attracted thereby, and all of the contacts 80-98 will remain in engagement with the shorting bar 46. Under these circumstances all of the resistors 32a are shorted out, and all of the controlled resistors 48a are shorted out. As the signal increases the output of the magnetic amplifier 100 will increase and the energization of the signal coil 2 will increase. Eventually the armature 4 will be moved sufficiently so as to separate the contact 80 from the shorting bar 36, thus effectively interposing the first controlled resistor 48a in the external circuit 118, 120. The armature 4 will continue to move until the contact 90 is lifted from the shorting bar 46, thus inserting the first resistance 32a in shunt with the control winding 112. The current through that winding will increase, thus decreasing the energization of the signal coil 2. If that decrease in signal coil energization is sufficient to bring the energization of the signal coil 2 to its predetermined nominal value and hence bring the movement of the armature 4 to a halt, the system will remain in equilibrium. If the energization of the signal coil 2 is still greater than its nominal value the armature will continue to move, the contact 82 will be moved away from the shorting bar 46, the second controlled resistor 48a will be inserted into the external circuit 118, 120, and the armature 4 will continue to move until the contact 92 is separated from the shorting bar 46, thus placing both the first and second resistors 32a in series with one another and in shunt with winding 112. The current through that winding 112 will further increase, thus further decreasing the energization of the signal coil 2, and if that decrease in energization counterbalances the signal so as to energize the control coil 2 at its nominal value, the armature will stop. This type of operation will continue in similar manner, and from this it will be realized that the number of controlled resistances 48a connected into the external circuit 118, 120 will be determined, at any given moment, by the magnitude of the signal applied to the terminals 22a, 24a and by the values of the individual resistors 32a. By making those resistors 32a variable, they may be set to cause the individual controlled resistors 48a to be sequentially inserted into the external circuit 118, 120 at desired signal values. It will be appreciated that the resistors 32a need not all have the same value, and that the controlled resistors 48a need not have the same value, so that a wide variety of relationships between variations in the signal and variations in the circuits 118, 120 may be accomplished.

The circuit of FIG. 3 is essentially similar to the circuit of FIG. 2, and, so far as is appropriate, similar reference numerals are applied thereto. For purposes of simplification only four contacts in each set are shown, contacts 80-86 comprising the first set and contacts 90-96 comprising the second set. The control winding 110 is connected to the signal terminals 22a and 24a by means of a choke 122, required only when very high sensitivity is involved, and by a resistor 124 used to keep the current in the control winding 110 low, thereby preventing transformer action in the event that harmonics are present in the signal. A resistor 126 is located in the circuit between the rectifier 114 and the control winding 112 for loading purposes. The resistors 32a are shown as adjustable. They are also shown in series with adjustable resistor 127 which, in conjunction with the first resistor 32a, is in shunt with the control winding 112 even when the contact 90 engages the shorting bar 46, the setting of the resistors 127 and the first resistor 32a determining the initial signal value at which the operation of the system will commence. The controlled devices 48b are illustrated as relay coils connected across full wave rectifiers 128. The individual relay windings 48b, when energized, control switch contacts as indicated by the broken lines in the drawings. The relay windings 48b are adapted to selectively energize indicating lights 130 by controlling the normally closed switch contacts 132 and the normally open switch contacts 134. They are further adapted to control external devices of any type, generally designated 135, connected to terminals 136 and 138, through actuation of normally closed switch contacts 140 and normally open switch contacts 142. The relay windings 48b, when energized, also control the effectiveness of adjustable resistors 144 through actuation of normally closed contacts 146 and normally open contacts 148, the resistors 144 also being connected in shunt across the control winding 112 in series with the resistors 127 and 32a.

The line voltage applied across the terminals 106 and 108 is connected directly to the circuit including the relay windings 48b by leads 150 and 152, and to the circuit including the indicator lights 130 by means of leads 154 and 156. A power-on light 158 is connected across the leads 154 and 156. The terminals 106 and 108 are also connected by leads 160 and 162 to primary winding 164 of transformer 166. One secondary winding 168 of that transformer is directly connected by leads 170 and 172 to the output windings 102 of the magnetic amplifier 100 and to the signal coil 2. Another secondary winding 174 of the transformer 164 is connected by leads 176 and 178 to the circuit including the rectifier 114, the resistors 32a and 144, and the control winding 112.

The operation of the system of FIG. 3 is basically the same as that of FIG. 2, except for the nature of the devices 48b, 130 and 135 controlled thereby. It includes the added feature that the operating point for any one of the controlled devices 48b will be different depending upon whether the signal is increasing or decreasing. This is accomplished by means of the resistors 144 and the contacts 146 and 148 which control them. Let us assume that the signal is low and is increasing. Before the contact 80 is lifted there is in shunt with the control winding 112 the resistor 127, the first resistor 32a, and the right hand portions of each of the resistors 144, a circuit being completed through the right hand portions of those resistors via the normally closed contacts 146. As the signal increases sufficiently to lift the contact 80, the relay coil 48b is energized, thus lighting the first lamp 130 and actuating the first device 135. At the same time the first normally closed contact 146 is opened and the first normally opened contact 148 is closed. This will place in the circuit the left hand part of the first resistor 144 and will remove from the circuit the right hand part of that resistor. With the resistors 144 set as disclosed, with the left hand parts thereof greater than the right hand parts thereof, this will cause an increase in the overall resistance in shunt with the control winding 112, thus partially counterbalancing the signal. The amount of this increase will be less than the increase in resistance caused by the resistors 32a. This change in the status of the circuit energizing the control winding 112 will remain in effect until such time as the contact 80 again engages the shorting bar 46 and de-energizes the first relay winding 48b. Consequently a lower signal will cause the relay winding 48b to be de-energized than was required to energize it. The same considerations apply as the contacts 82, 84 and 86 are separated from the shorting bar 46.

With the system of the present invention signal changes as small as 2.5 millivolts at 7.5 microamperes can be caused to energize successive controlled devices such as relays, with response times of between 50 and 200 milliseconds. Through appropriate circuit design the system can be arranged to have its nominal zero position at one end of its range of operation, thereby operating over a band of maximum width, or to have its nominal zero position in the middle of its range of operation, thus operating in either direction from that initial position depending upon the polarity of the signal applied. The system is capable of selectively actuating controlled devices on the basis of signal differences of 2.5 to 100 millivolts and 7.5 to 400 microamperes, with an accuracy in that sensing and control of plus or minus .5 millivolt and plus or minus .5 microampere. A wide variety of relationships between the change in the control circuit and variation in the input signal can be achieved by assigning appropriate values to the resistors 32 and through using appropriate controlled devices 48. If desired, the individual controlled devices 48 can be actuated and de-actuated respectively at different signal values.

The meter relay unit itself may be in the form of a small and self-contained mechanical unit adapted to be plugged into a suitable chassis, the magnetic amplifier 100 may be comparably constructed and arranged, and the resistors 32a (and 144 when desired) may be in the form of adjustable elements. Hence a single standard assembly formed of a chassis on which the meter relay unit, the magnetic amplifier 100 and the resistors 32 (and 144) are mounted may be used for widely different system purposes.

While but a limited number of embodiments of the present invention have been here specifically disclosed, it will be apparent that many variations may be made therein, all within the scope of the instant invention as defined in the following claims.

I claim:

1. A meter relay system for controlling devices in an output circuit in response to an electrical signal, which comprises: a meter relay unit comprising a control coil, a movable armature operatively connected to said coil so as to be positioned thereby; first and second sets of contacts arranged in sequential relative alternation, and an operative connection between said armature and said contacts for sequentially opening and closing said contacts as said armature moves in one direction or the other; an amplifier comprising output means and control means; a power source; a signal source; an electric connection between said power source, said amplifier output means and said control coil; means operatively connecting said signal source and said amplifier control means for actuating the latter in accordance with the former; means operatively connecting said power source and said amplifier control means and effective to render the operation of said amplifier substantially independent of variations in the voltage of said power source; means including said second set of contacts operatively connected to said amplifier control means for modifying the current through said control coil in accordance with the position of said armature; an output circuit comprising controlled devices; and an operative connection between said first set of contacts and said controlled devices for controlling the latter in accordance with the position of said armature.

2. In the system of claim 1, means including said first set of contacts operatively connected to said amplifier control means for further modifying the current through said control coil in accordance with the position of said armature.

3. A meter relay system for controlling devices in an output circuit in response to an electrical signal, which comprises: a meter relay unit comprising a control coil, a movable armature operatively connected to said coil so as to be positioned thereby; first and second sets of contacts arranged in sequential relative alternation, and an operative connection between said armature and said contacts for sequentially opening and closing said contacts as said armature moves in one direction or the other; a magnetic amplifier comprising output winding means and control winding means; a power source; a signal source; an electric connection between said power source, said output winding means, and said control coil; means operatively connecting said signal source and said control winding means for actuating the latter in accordance with the former; means operatively connecting said power source and said control winding means and effective to render the operation of said magnetic amplifier substantially independent of variations in the voltage of said power source; means including said second set of contacts operatively connected to said control winding means for modifying the current through said control coil in accordance with the position of said armature; an output circuit comprising controlled devices; and an operative connection between said first set of contacts and said controlled devices for controlling the latter in accordance with the position of said armature.

4. In the system of claim 3, means including said first set of contacts operatively connected to said control winding means for further modifying the current through said control coil in accordance with the position of said armature.

5. A meter relay system for controlling devices in an output circuit in response to an electrical signal which comprises: a meter relay unit comprising a control coil, a movable armature operatively connected to said coil so as to be positioned thereby; second sets of contacts arranged in sequential relative alternation and an operative connection between said armature and said contacts for sequentially opening and closing said contacts as said armature moves in one direction or the other; a magnetic amplifier comprising an output winding, a main control winding, and secondary control winding means; a source of power; a signal source; an electrical connection between said power source, said output winding and said control coil; an electrical connection between said signal source and said main control winding; means operatively connected to said secondary control winding means and effective to render the operation of said magnetic amplifier insensitive to changes in voltage of said power source; means including said second set of contacts operatively connected to said secondary control winding means for modifying the output of said magnetic amplifier, and hence the energization of said control coil, in accordance with the position of said armature; an output circuit comprising controlled devices; and an operative connection between said first set of contacts and said controlled devices for controlling the latter in accordance with the position of said armature.

6. In the system of claim 5, means including said first set of contacts operatively connected to said secondary control winding means for further modifying the output of said magnetic amplifier in accordance with the position of said armature.

7. A meter relay system for controlling devices in an output circuit in response to an electrical signal which comprises: a meter relay unit comprising a control coil, a movable armature operatively connected to said coil so as to be positioned thereby, first and second sets of contacts arranged in sequential relative alternation, and an operative connection between said armature and said contacts for sequentially opening and closing said contacts as said armature moves in one direction or the other; a magnetic amplifier comprising an output winding and first and second control windings; a power source; a signal source; a first circuit comprising said output winding, said power source and said control coil; a second circuit electrically connecting said first control winding and said signal source; a third circuit electrically connecting said second control winding and said power source; a variable impedance in shunt with said second control winding; an operative connection between said second set of contacts and said variable impedance for varying the latter in accordance with the position of said armature; an output circuit comprising controlled devices; and an operative connection between said first set of contacts and said controlled devices for controlling the latter in accordance with the position of said armature.

8. In the system of claim 7, a second variable impedance in shunt with said second control winding, and an operative connection between said first set of contacts and said second variable impedance for varying the latter in accordance with the position of said armature.

9. The system of claim 8, in which the amount by which said second variable impedance is varied upon the actuation of one of the contacts of said first set of contacts is less than the amount by which said first mentioned variable impedance is varied through the action of one of the contacts of said second set of contacts.

10. A meter relay system for controlling devices in an output circuit in response to an electrical signal, which comprises: a meter relay unit comprising a control coil, a movable armature operatively connected to said coil so as to be positioned thereby; first and second sets of contacts arranged in sequential relative alternation, and an operative connection between said armature and said contacts for sequentially opening and closing said contacts as said armature moves in one direction or the other; an amplifier comprising output means and control means; a power source; a signal source; an electric connection between said power source, said amplifier output means and said control coil; means operatively connecting said signal source and said amplifier control means for actuating the latter in accordance with the former; means including said second set of contacts operatively connected to said amplifier control means for modifying the current through said control coil in accordance with the position of said armature; an output circuit comprising controlled devices; and an operative connection between said first set of contacts and said controlled devices for controlling the latter in accordance with the position of said armature.

11. A meter relay system for controlling devices in an output circuit in response to an electrical signal, which comprises: a meter relay unit comprising a control coil, a movable armature operatively connected to said coil so as to be positioned thereby; first and second sets of contacts arranged in sequential relative alternation, and an operative connection between said armature and said contacts for sequentially opening and closing said contacts as said armature moves in one direction or the other; a mag-netic amplifier comprising output winding means and control winding means; a power source; a signal source; an electric connection between said power source, said output winding means, and said control coil; means operatively connecting said signal source and said control winding means for actuating the latter in accordance with the former; means including said second set of contacts operatively connected to said control winding means for modifying the current through said control coil in accordance with the position of said armature; an output circuit comprising controlled devices; and an operative connection between said first set of contacts and said controlled devices for controlling the latter in accordance with the position of said armature.

12. A meter relay system for controlling devices in an output circuit in response to an electrical signal which comprises: a meter relay unit comprising a control coil, a movable armature operatively connected to said coil so as to be positioned thereby, first and second sets of contacts arranged in sequential relative alternation, and an operative connection between said armature and said contacts for sequentially opening and closing said contacts as said armature moves in one direction or the other; a magnetic amplifier comprising an output winding, a main control winding, and secondary control winding means; a source of power; a signal source; an electrical connection between said power source, said output winding and said control coil; an electrical connection between said signal source and said main control winding; means including said second set of contacts operatively connected to said secondary control winding means for modifying the output of said magnetic amplifier, and hence the energization of said control coil, in accordance with the position of said armature; an output circuit comprising controlled devices; and an operative connection between said first set of contacts and said controlled devices for controlling the latter in accordance with the position of said armature.

13. In the system of claim 12, a second variable impedance in shunt with said second control winding and in series with said first mentioned impedance, and an operative connection between said first set of contacts and said second variable impedance for varying the latter in accordance with the position of said armature.

14. The system of claim 13, in which the amount by which said second variable impedance is varied upon the actuation of one of the contacts of said first set is less than the amount by which said first mentioned variable impedance is varied through the action of a contact of said second set.

15. The system of claim 7, in which said third circuit comprises means for rendering the energization of said second control winding independent of variations in the voltage of said power source.

References Cited in the file of this patent

UNITED STATES PATENTS 2,702,881 Kubler _____ Feb. 22, 1958
2,825,808 Doelz et al. _____ Mar. 4, 1958